(No Model.)

C. A. BLESSING.
JOINT OR COUPLING FOR WATER CLOSET BOWLS, &c.

No. 557,645. Patented Apr. 7, 1896.

WITNESSES:
P. H. Eagle.
L. Douville,

INVENTOR
Charles A. Blessing
BY John A. Wiedersheim
ATTORNEY.

ANDREW B. GRAHAM. PHOTO-LITHO. WASHINGTON, D.C.

UNITED STATES PATENT OFFICE.

CHARLES A. BLESSING, OF PHILADELPHIA, PENNSYLVANIA.

JOINT OR COUPLING FOR WATER-CLOSET BOWLS, &c.

SPECIFICATION forming part of Letters Patent No. 557,645, dated April 7, 1896.

Application filed March 15, 1895. Serial No. 541,948. (No model.)

*To all whom it may concern:*

Be it known that I, CHARLES A. BLESSING, a citizen of the United States, residing in the city and county of Philadelphia, State of Pennsylvania, have invented a new and useful Improvement in Joints or Couplings for Water-Closet Bowls, &c., which improvement is fully set forth in the following specification and accompanying drawings.

My invention consists of a novel coupling for the parts of a water-closet bowl, washbasin, sink, &c., the same being effective in operation, of simple construction, and may be readily applied and removed.

Figure 1:
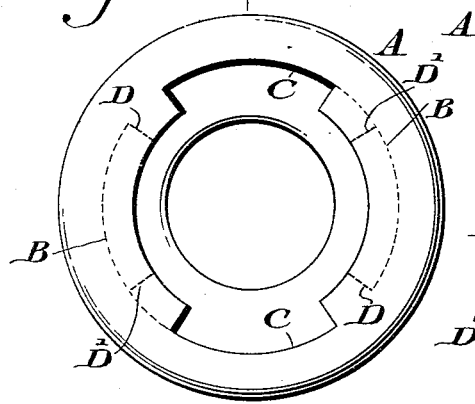
Figure 2:
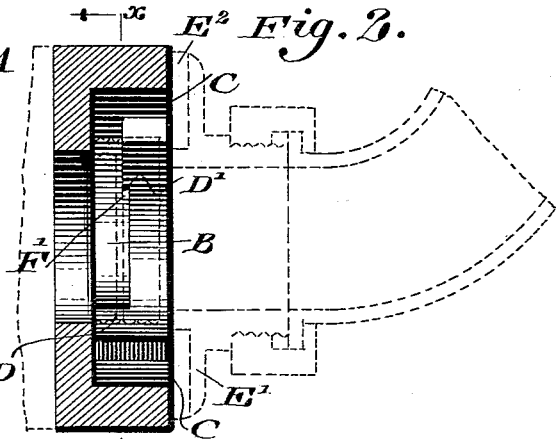
Figure 3:
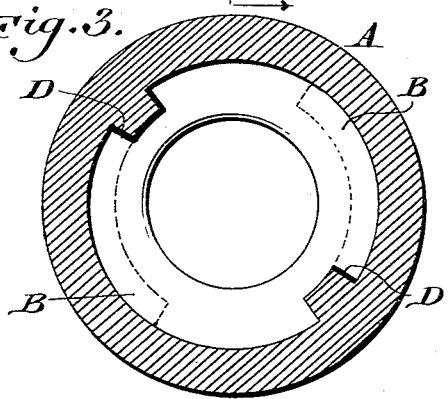
Figure 4:
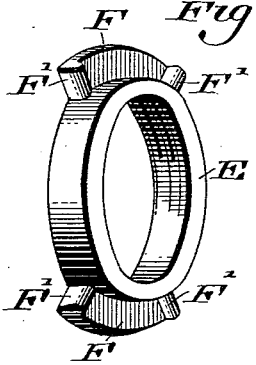
Figure 5:
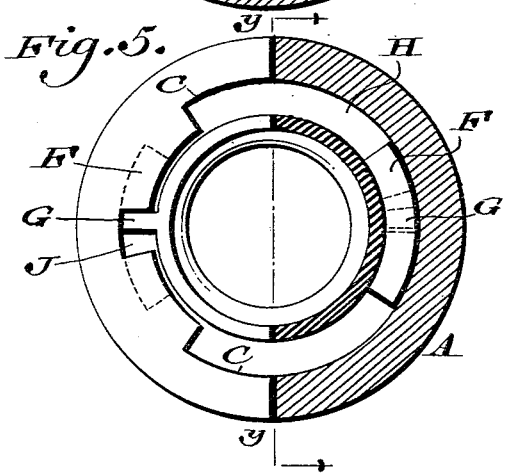
Figure 6:
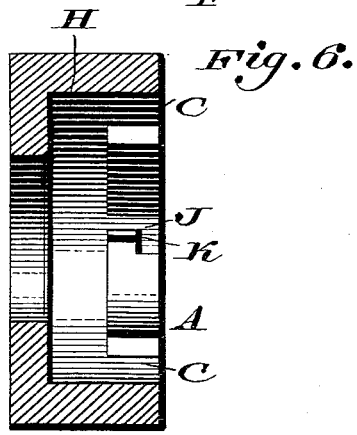

Figure 1 represents a face view of part of a coupling embodying my invention. Fig. 2 represents a diametrical section thereof. Fig. 3 represents a section of the coupling on line *x x*, Fig. 2. Fig. 4 represents a perspective view of a detached portion thereof. Fig. 5 represents a partial face view and partial section of a modification. Fig. 6 represents a section thereof on line *y y*, Fig. 5, a part of the coupling having been removed.

Similar letters of reference indicate corresponding parts in the several figures.

Referring to the drawings, A designates a hollow boss or hub of annular form, having in its inner wall, near the rim, the circumferential grooves B and in its face the transverse throats C, which communicate with said grooves.

D D' designate shoulders at the opposite termini of the grooves B, the same forming stops to be hereinafter more fully explained.

E designates a sleeve or bushing which is internally threaded and provided with lugs F, projecting from the periphery thereof, said sleeve being of slightly less diameter than that of the central opening of the boss A, so as to freely enter the same, while the lugs F are adapted to enter the throats C. On one side and at the ends of the lugs F are shoulders F', for purposes to be hereinafter explained.

The boss A constitutes part of the inlet or outlet of a water-closet bowl, washbasin, sink, &c., and communicates therewith, and the bushing E is designed for the connection of the spud of a supply or discharge pipe thereof, the operation being as follows: The bushing is presented to the boss and introduced into the central opening of the same, and the lugs F enter the throats C. The bushing is now turned, whereby the lugs enter the grooves B and abut against the shoulders or stops D, thus limiting the degree of rotation of the bushing, while the walls of the groove engage the lugs F, and thus prevent outward displacement or disconnection of the bushing. The spud E' of a supply or discharge pipe may now be screwed to the bushing, while the flange of said spud presses the washer $E^2$ against the face of the boss, thus producing a tight joint and firmly and reliably connecting the pipe with the bowl, basin, &c., to which the boss is applied.

As the shoulders F' project from the faces of the lugs F at the ends thereof, they permit said lugs F to conform to irregularities on the walls of the grooves B, against which they tighten, and then when it is desired to uncouple the parts the shoulders F' abut against the shoulders D, and thus prevent the rotation of the bushing during the unscrewing of the spud or attached part of the coupling; otherwise said bushing would rotate and prevent such unscrewing.

When the coupling is unscrewed and the lugs register with the throats, the bushing may be easily removed, as is evident.

In Figs. 5 and 6 I show the bushing with two lugs G G in addition to the lugs F, and the groove H in the inner wall of the boss is sufficiently wide to receive said lugs F and G and permit the latter to rotate therein. In the inner wall of the boss are throats J, and adjacent to the same are shoulders K, on which the lugs G may be seated, and whose side walls prevent rotation of said bushing, it being seen that when the bushing is inserted in the boss and the lugs F and G passed through the throats C until they reach the groove H the bushing is rotated until the lugs G register with the throats J, when the bushing is drawn outwardly and again rotates when said lugs G are seated on the shoulders K, thus preventing rotation of the bushing, while the wall of the groove H engages with the lugs F and prevents outward displacement or disconnection of the bushing from the boss, as in the previously-described construction.

Having thus described my invention, what I claim as new, and desire to secure by Letters Patent, is—

1. A coupling for the purpose set forth, consisting of a boss having grooves with shoulders at their ends on its inner wall near its rim, and the transverse throats C in its face, and the bushing E provided with the lugs F having on the side at the ends thereof the shoulders F', said parts being combined substantially as described.

2. A coupling for the purpose set forth consisting of a boss having the transverse throats C, J, with shoulders K adjacent thereto and provided with grooves on its inner wall in combination with a bushing having the lugs F, F, and G, G, said lugs F, F, being adapted to engage with the wall of said grooves and said lugs G, G, to be seated on said shoulders, substantially as described.

CHARLES A. BLESSING.

Witnesses:
H. L. KULM,
JOHN A. WIEDERSHEIM.